United States Patent
Adachi

(10) Patent No.: US 10,104,279 B2
(45) Date of Patent: Oct. 16, 2018

(54) CONTROL APPARATUS, METHOD OF CONTROLLING THE SAME, AND STORAGE MEDIUM

(71) Applicant: CANON KABUSHIKI KAISHA, Tokyo (JP)

(72) Inventor: Takashi Adachi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/716,721

(22) Filed: Sep. 27, 2017

(65) Prior Publication Data

US 2018/0035038 A1  Feb. 1, 2018

Related U.S. Application Data

(63) Continuation of application No. 15/091,943, filed on Apr. 6, 2016, now Pat. No. 9,794,463.

(30) Foreign Application Priority Data

Apr. 13, 2015 (JP) ................................ 2015-082065

(51) Int. Cl.
*H04N 5/232* (2006.01)
*H04N 7/18* (2006.01)

(52) U.S. Cl.
CPC ..... *H04N 5/23203* (2013.01); *H04N 5/23216* (2013.01); *H04N 5/23296* (2013.01); *H04N 7/183* (2013.01)

(58) Field of Classification Search
None
See application file for complete search history.

(56) References Cited

U.S. PATENT DOCUMENTS 8,594,390 B2  11/2013  Yoshizumi
2012/0026344 A1  2/2012  Ezoe et al.

FOREIGN PATENT DOCUMENTS

JP  2004-157869 A  6/2004

*Primary Examiner* — Mark T Monk
(74) *Attorney, Agent, or Firm* — Carter, Deluca, Farrell & Schmidt, LLP

(57) ABSTRACT

A control apparatus comprises a determination unit configured to determine a region defined by a pair of first coordinate values and a pair of second coordinate values which are designated on a captured image displayed on a display unit; a display control unit configured to control the display unit to display, when the region exceeds a display range of the captured image in accordance with an operation of designating at least one of the pair of first coordinate values and the pair of second coordinate values, a predetermined image including at least a part of the region on a portion that has exceeded the range while holding the region; and an output unit configured to output a command for obtaining a captured image corresponding to the region displayed and controlled by the display control unit.

14 Claims, 8 Drawing Sheets

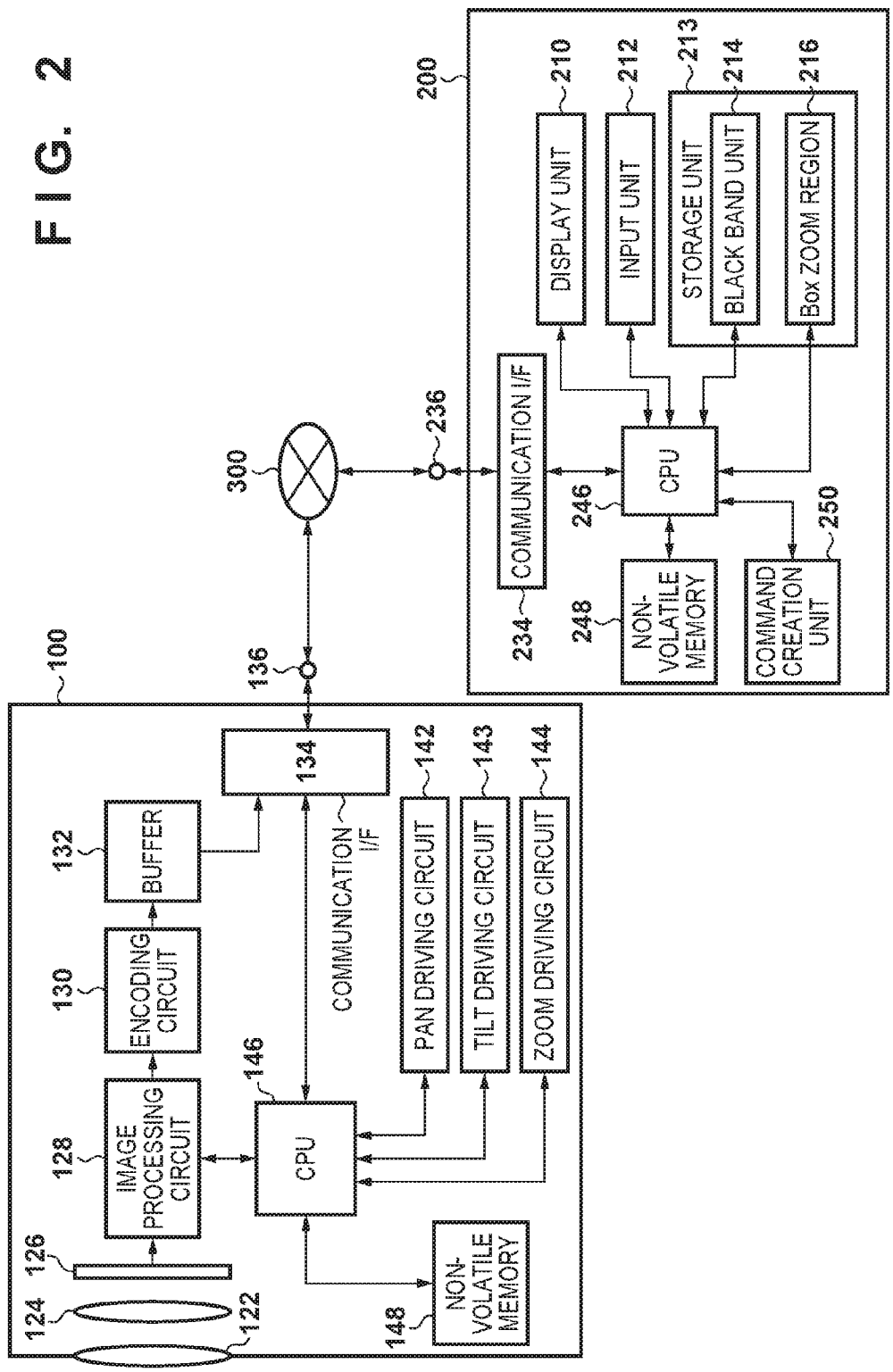

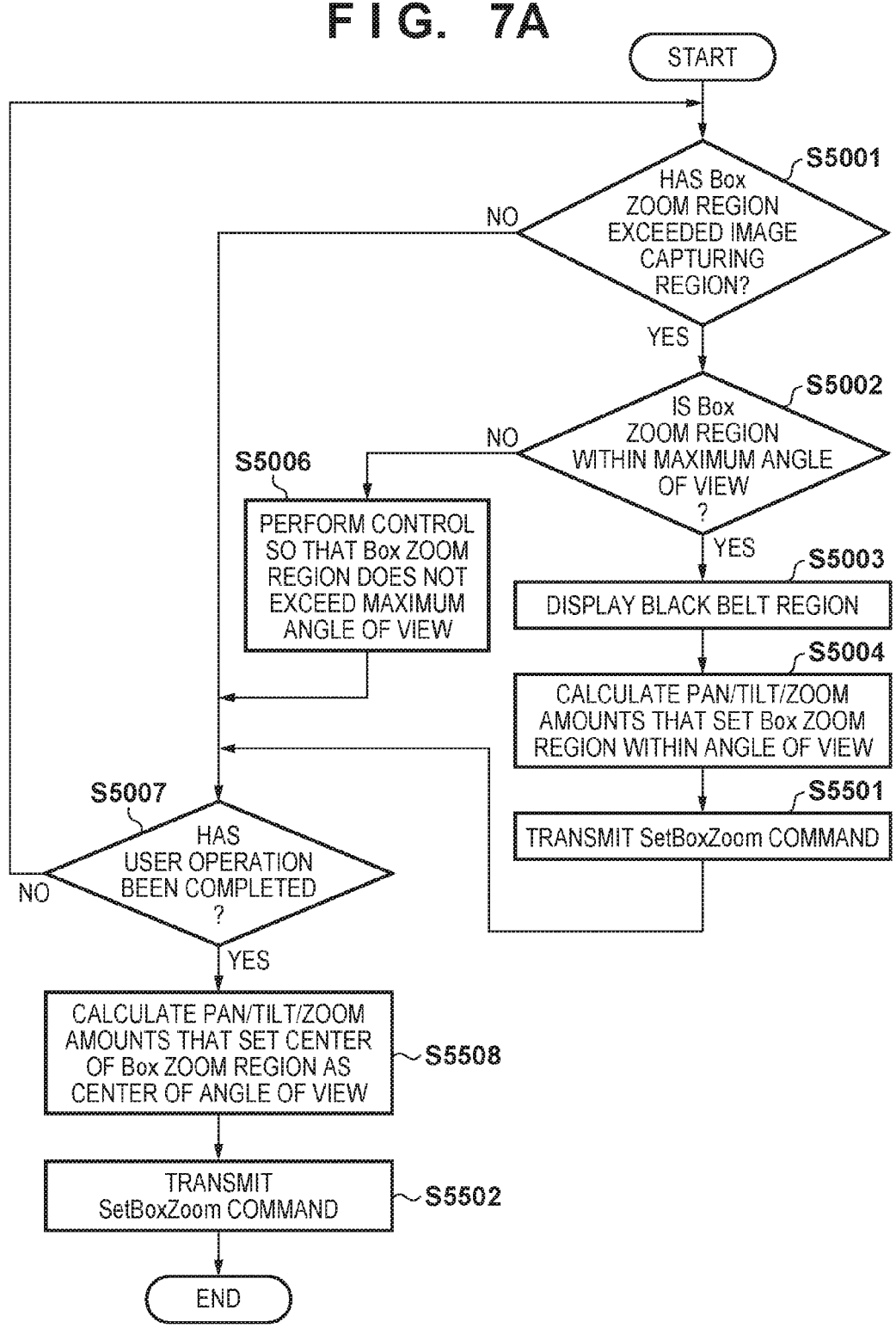

CONTROL APPARATUS, METHOD OF CONTROLLING THE SAME, AND STORAGE MEDIUM

CROSS REFERENCE TO RELATED APPLICATIONS

This application is a continuation of U.S. patent application Ser. No. 15/091,943, filed on Apr. 6, 2016, which claims the benefit of and priority to Japanese Patent Application No. 2015-082065, filed on Apr. 13, 2015, the disclosures of each of which are hereby incorporated by reference herein in their entirety.

BACKGROUND OF THE INVENTION

Field of the Invention

The present invention relates to a technique for obtaining a captured image from an image capturing apparatus and controlling the display of the captured image on a display unit.

Description of the Related Art

As a conventional technique for changing an angle of view of an image capturing apparatus such as a monitoring camera, there is proposed a technique in which an image capturing direction of the image capturing apparatus and a focal length of a telephoto/wide-angle optical system are changed, by user operation via an information processing apparatus, to change the angle of view. A technique for instructing an image zoom operation via an image displayed on the monitor that is incorporated in a digital camera or a portable terminal has also been proposed.

Japanese Patent Laid-Open No. 2004-157869 discloses a portable terminal capable of performing a zoom operation on an arbitrarily designated display screen region by displaying a zoom region, which has been instructed via the portable terminal, on a screen and enlarging and displaying the zoom region on the entire screen.

However, in the case of the conventional art, the range that can be enlarged is limited by the range of the image displayed by the portable terminal. Therefore, the range of enlargement cannot be designated to be greater than the range of the captured image.

The present invention has been made to solve the above problems, and provides a technique capable of easily and appropriately adjusting an image capturing range of a captured image.

SUMMARY OF THE INVENTION

According to one aspect of the present invention, there is provided a control apparatus that obtains a captured image from an image capturing apparatus and controls display of the captured image on a display unit, comprising: a determination unit configured to determine a region defined by a pair of first coordinate values and a pair of second coordinate values which are designated on the captured image displayed on the display unit; a display control unit configured to control the display unit to display, when the region exceeds a display range of the captured image in accordance with an operation of designating at least one of the pair of first coordinate values and the pair of second coordinate values, a predetermined image including at least a part of the region on a portion that has exceeded the range while holding the region; and an output unit configured to output a command for obtaining a captured image corresponding to the region displayed and controlled by the display control unit.

Further features of the present invention will become apparent from the following description of exemplary embodiments with reference to the attached drawings.

BRIEF DESCRIPTION OF THE DRAWINGS

FIG. 2 is a block diagram showing the hardware arrangement of an image capturing apparatus and a client;

FIGS. 7A and 7B are flowcharts showing the operations of the client and the image capturing apparatus.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1A:
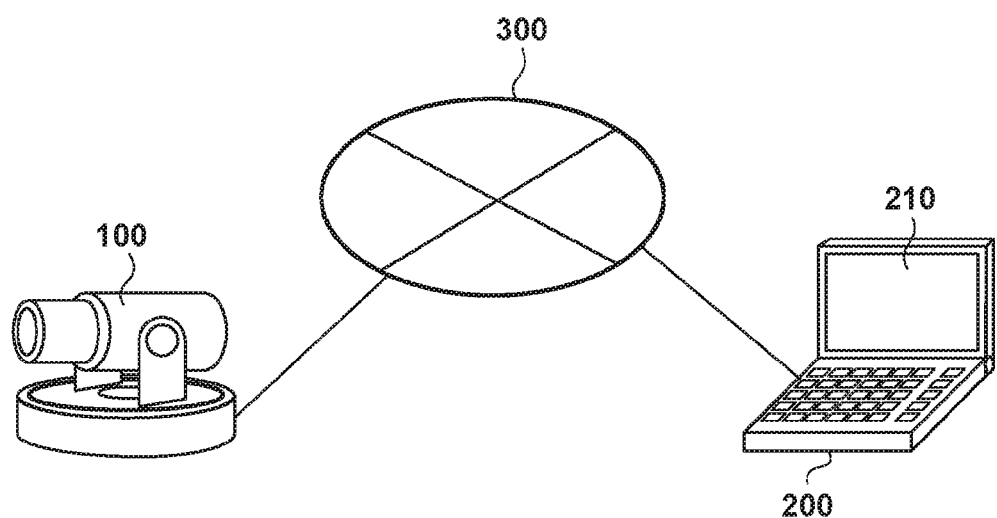
FIGS. 1A and 1B are views showing the arrangement of an image capturing system.

FIG. 1A is a view showing an example of the arrangement of an image capturing system. In the image capturing system according to the embodiment, an image capturing apparatus 100 and a client 200 as an external apparatus are connected to each other via a network 300. This allows the image capturing apparatus 100 to communicate with the client 200 via the network 300. The image capturing apparatus 100 distributes a captured image to the client 200 via the network 300. The client 200 is an example of an external apparatus and can be, for example, constituted by an information processing apparatus. In addition, the client 200 is also a control apparatus capable of setting image capturing conditions on the image capturing apparatus 100 and controlling its operation.

Note that the image capturing apparatus 100 is, for example, a monitoring camera that captures a moving image or a still image. More specifically, assume that the image capturing apparatus 100 is an image capturing apparatus for monitoring, and communication between the image capturing apparatus 100 and the client 200 is performed by using, for example, a communication protocol defined by ONVIF. Also, assume that the image capturing apparatus 100 is installed in, for example, a predetermined position within a space such as a wall or ceiling.

The network 300 is formed by, for example, communication devices and communication lines such as a plurality of routers, switches, and cables that operate according to a communication specification such as Ethernet®. In the embodiment, any communication specification, scale or arrangement is applicable as long as communication between the image capturing apparatus 100 and the client 200 is possible. For example, the network 300 can be can be constituted by a communication line such as the internet, a wired LAN (Local Area Network), a wireless LAN, or a WAN (Wide Area Network). Note that the image capturing apparatus 100 can comply with PoE (Power over Ethernet®) and be supplied with power via a LAN cable.

The client 200 receives a captured image distributed from the image capturing apparatus 100 via the network 300 and displays the received image on a display unit 210. The client 200 also transmits to the image capturing apparatus 100, via the network 300, a command in accordance with a user operation. For example, the client 200 transmits, in a format defined by ONVIF, a command (request) for changing the image capturing conditions (for example, the image capturing direction, angle of view, and the like) of the image capturing apparatus 100.

The image capturing apparatus 100 changes the image capturing direction (pan, tilt) in accordance with a command, received from the client 200, for changing the image capturing direction. In addition, the image capturing apparatus 100 changes the angle of view in accordance with a command, received from the client 200, for changing the angle of view (zoom [telephoto control/wide-angle control]).

Figure 1B:
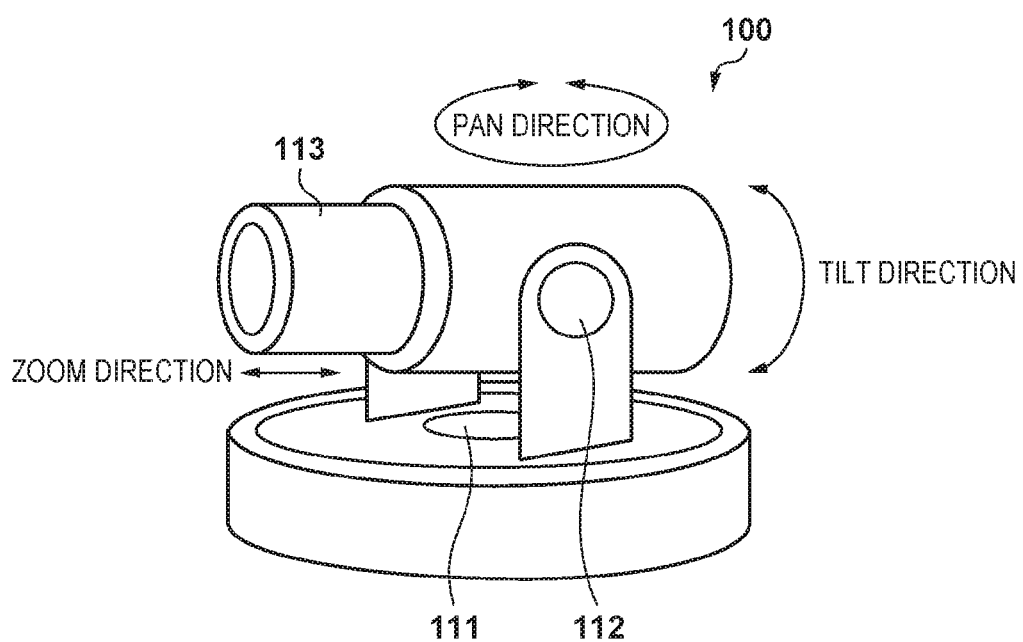

FIG. 1B is a view showing an example of a driving mechanism for the image capturing apparatus 100 to change the image capturing direction or the angle of view. A pan driving mechanism 111 changes the image capturing direction of the image capturing apparatus 100 in the pan direction. A tilt driving mechanism 112 changes the image capturing direction of the image capturing apparatus 100 in the tilt direction. A zoom mechanism 113 changes the angle of view of the image capturing apparatus 100. In this manner, the pan driving mechanism 111, the tilt driving mechanism 112, and the zoom mechanism 113 constitute a PTZ driving mechanism that changes the respective pan, tilt, and zoom of the image capturing apparatus 100. Note that in this embodiment, driving of each pan driving mechanism 111, the tilt driving mechanism 112, and the zoom mechanism 113 is implemented by, for example, a driving system such as a stepping motor and a gear.

FIG. 2 is a block diagram showing an example of the hardware arrangement of the image capturing apparatus 100 and the client 200.

The image capturing apparatus 100 includes a front lens 122 and a variator lens 124 of the image capturing optical system, an image sensor 126, an image processing circuit 128, an encoding circuit 130, a buffer 132, a communication circuit 134 (to be referred to as a communication I/F hereinafter), and a communication terminal 136. The image capturing apparatus 100 also includes a pan driving circuit 142, a tilt driving circuit 143, a variator lens driving circuit 144 (to be referred to as a zoom driving circuit hereinafter), a central processing unit 146 (to be referred to as a CPU hereinafter), and a non-volatile memory 148.

The client 200 includes a communication terminal 236, a communication circuit 234 (to be referred to as a communication I/F hereinafter), a central processing unit 246 (to be referred to as a CPU hereinafter), a non-volatile memory 248, a display unit 210, an input unit 212, a storage unit 213, and a command creation unit 250. The storage unit 213 stores, as various kinds of data and parts of variables to be used in the client 200, a Box zoom region 216 serving as a predetermined region and a black belt region 214 serving as a predetermined image.

Note that the non-volatile memories 148 and 248 are, for example, EEPROMs (Electrically Erasable Programmable Read Only Memories). The non-volatile memory 148 stores various kinds of programs such as a control program for controlling the operation of the image capturing apparatus 100. The CPU 146 can control the various kinds of operations of the image capturing apparatus 100 by reading out and executing the programs stored in the non-volatile memory 148. The non-volatile memory 248 stores various kinds of programs such as a control program for controlling the operation of the client 200. The CPU 246 can control the various kinds of operations of the client 200 by reading out and executing the programs stored in the non-volatile memory 248.

Next, the operations of the image capturing apparatus 100 and the client 200 will be described with reference to FIG. 2.

A light beam from an object to be captured by the image capturing apparatus 100 enters the image sensor 126 via the front lens 122 and the variator lens 124 of the image capturing optical system and is photoelectrically converted by the image sensor 126. The zoom driving circuit 144 moves the variator lens 124 in the optical-axis direction based on a driving signal from the CPU 146. The focal length of the image capturing optical system changes along with this movement of the variator lens 124. The angle of view of the image to be captured by the image capturing apparatus 100 changes from this change in the focal length.

A pan driving motor (not shown) is driven based on a driving signal input from the CPU 146 to the pan driving circuit 142. The pan driving mechanism 111 in FIG. 1B is driven by this driving operation, and the image capturing direction in the pan direction of the image capturing apparatus 100 changes. In the same manner, a tilt driving motor (not shown) is driven based on a driving signal input from the CPU 146 to the tilt driving circuit 143. The tilt driving mechanism 112 in FIG. 1B is driven by this driving operation, and the image capturing direction in the tilt direction of the image capturing apparatus 100 changes.

In the embodiment, when a normal image capturing operation is to be performed, an image signal consisting of a luminance signal and a color difference signal is output as a captured image signal from the image processing circuit 128 to the encoding circuit 130 based on an instruction from the CPU 146. The encoding circuit 130 encodes the input image signal, and the encoded image signal is output to the outside via the buffer 132, the communication I/F 134, and the communication terminal 136.

The client 200 obtains, via the communication terminal 236 and the communication circuit 234, the captured image distributed from the image capturing apparatus 100 via the network 300. The client 200 outputs the obtained captured image to the display unit 210 and displays the image. The input unit 212 is an input device that accepts user input and is formed from, for example, a pointing device or a touch panel. The user can perform a mouse operation or a touch operation by the input unit 212. Additionally, by performing a predetermined operation by using the input unit 212, the user can cause the Box zoom region 216 for enlarging (zooming) a displayed captured image to be displayed on the display unit 210. As an example of this predetermined operation, there is an operation in which a dragging operation (pressing down an input unit (for example, a mouse button) and moving the cursor to the intended position) is performed and the cursor is released. Furthermore, the user can use the input unit 212 to perform a moving operation of changing the display position of the displayed Box zoom region 216 on the display unit 210 while maintaining the size of the Box zoom region 216.

If the Box zoom region 216 exceeds the range of the displayed captured image in accordance with the user operation, the client 200 displays the black belt region 214 and continues to display the Box zoom region 216. Additionally, the client 200 can create, by the command creation unit 250, a command that gives an instruction to change the pan, tilt, and zoom of the image capturing apparatus 100 in order to obtain an image of an angle of view that includes the Box zoom region 216. The created command is transmitted to the image capturing apparatus 100, via the communication circuit 234 and the communication terminal 236, to change the image capturing direction. If a captured image is transmitted from the image capturing apparatus 100, the client 200 displays the captured image again on the black belt region 214. A past captured image of the corresponding region can be used as the black belt region 214. Alternatively, an image including another message (for example, information indicating that Box zoom region exceeds the image capturing range of the current image capturing apparatus 100) can be used.

Figure 3:
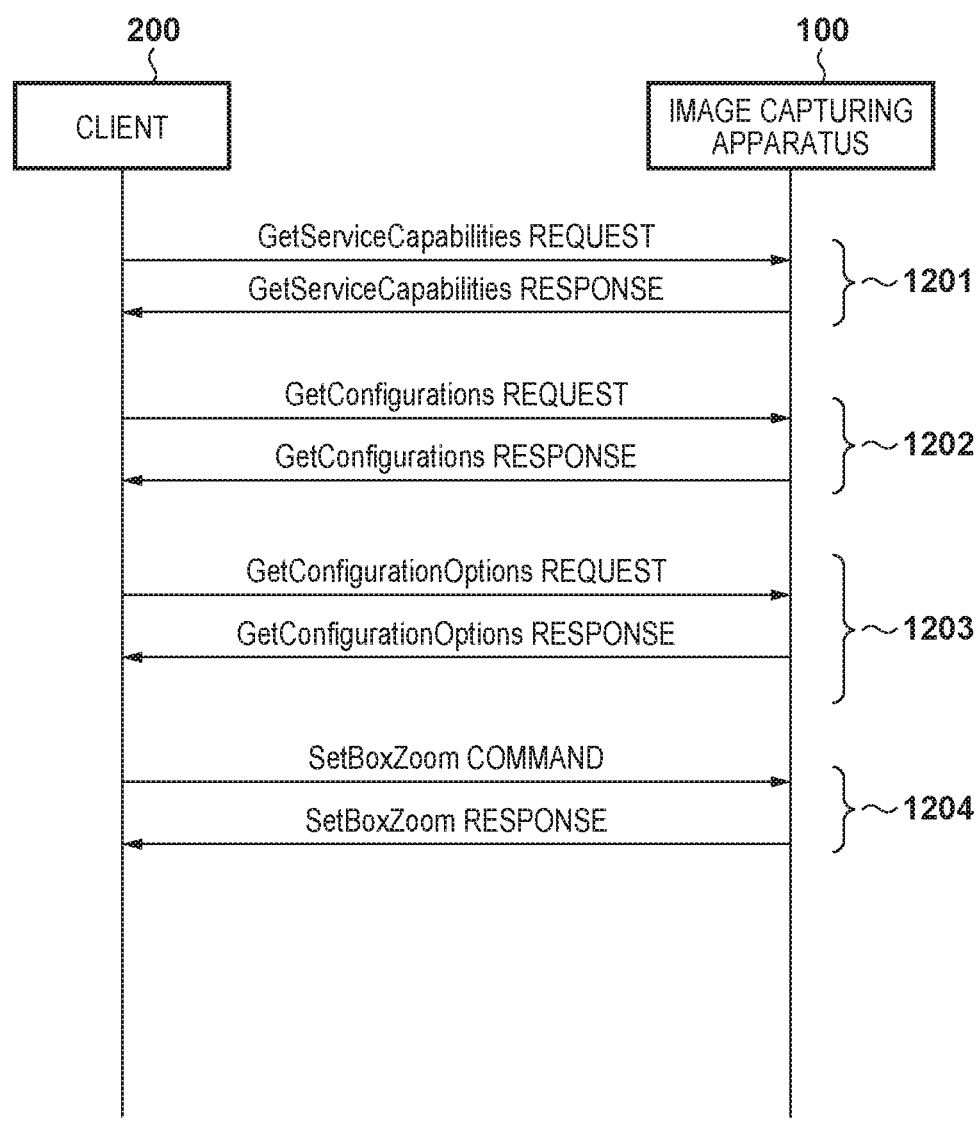
FIG. 3 is a sequence chart showing a command sequence.

Next, a typical BoxZoom command sequence, between the client 200 and the image capturing apparatus 100, for changing the settings of the zoom magnification and the image capturing direction of the image capturing apparatus 100 will be described with reference to FIG. 3. Note that each transaction to be described below indicates a pair of a request transmitted from the client 200 to the image capturing apparatus 100 and a response to the request returned from the image capturing apparatus 100 to the client 200 by using a predetermined command.

A transaction 1201 is the transaction of a GetServiceCapabilities command. By issuing a GetServiceCapabilities request to the image capturing apparatus, the client 200 can give instructions to return functional information indicating the functions (capabilities) supported by the image capturing apparatus 100. This functional information includes information of a SetBoxZoom command which indicates a zoom operation instruction for the region designated in the captured image.

When the user confirms the settings of first coordinates (for example, P1 coordinates) and second coordinates (for example, P2 coordinates) concerning the captured image to be displayed on the display unit 210, the client 200 issues a SetBoxZoom command including the first coordinates and the second coordinates. In this case, a rectangle defined by the diagonal line connecting the first coordinates and the second coordinates is set as the Box zoom region.

Based on this SetBoxZoom command, the image capturing apparatus 100 calculates, from the obtained first coordinates and the second coordinates, a change value of the image capturing angle and the zoom magnification indicating the angle of view of the image capturing apparatus 100 and drives the image capturing apparatus 100 based on the calculated change value. In the following description, BoxZoom, SetBoxZoom, and SetBoxZoomConfiguration may be abbreviated as "BZ", "SetBZ", and "SetBZC", respectively.

A transaction 1202 is the transaction of a GetConfigurations command. The client 200 can obtain PTZ setting information of the image capturing apparatus 100 from the image capturing apparatus 100 by issuing a GetConfigurations request to the image capturing apparatus 100. In response to this GetConfigurations command, the image capturing apparatus 100 returns, to the client 200, a GetConfigurations response including a list of all the PTZ settings set in the image capturing apparatus. Together with the plurality of PTZ settings, respective pieces of Token information which are identification information for identifying the PTZ settings are included in the PTZ settings list. This Token information will be referred to as ConfigurationToken in the embodiment.

A transaction 1203 is the transaction of a GetConfigurationOptions command. The client 200 can issue a GetConfigurationOptions request to the image capturing apparatus 100 by including a ConfigurationToken in the request. Upon receiving the request, the image capturing apparatus 100 returns a GetConfigurationOptions response including the option information usable in the settings designated by the ConfigurationToken to the client 200. For example, in the embodiment, the GetConfigurationOptions response includes the list information of ProfileToken settable in a SetBoxZoom command. The client 200 can issue a SetBoxZoom command by selecting a desired ProfileToken from a ProfileToken list.

A transaction 1204 is the transaction of a SetBoxZoom command. The client 200 transmits a SetBoxZoom command including the SetBoxZoom request information, the ProfileToken information, the first coordinates, and the second coordinates to the image capturing apparatus 100. Upon receiving the command, the image capturing apparatus 100 stores the ProfileToken, the first coordinates, and the second coordinates included in the SetBoxZoom command in, for example, the non-volatile memory 148. The image capturing apparatus 100 also returns a SetBoxZoom response to the client 200 in accordance with the contents included in the SetBoxZoom command.

The image capturing apparatus 100 changes the angle of view of the image captured by itself based on the stored first coordinates and the second coordinates. That is, the image capturing apparatus 100 performs driving of the pan, tilt, and zoom mechanisms to obtain an image in the designated angle of view.

Figure 4A:
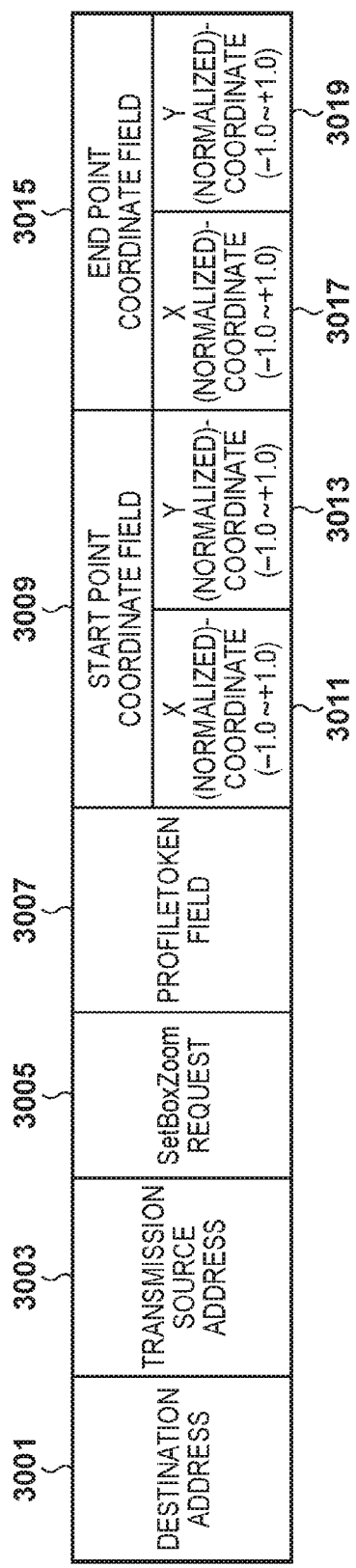
FIGS. 4A and 4B are views showing the structure of a SetBoxZoom command/response.
Figure 4B:
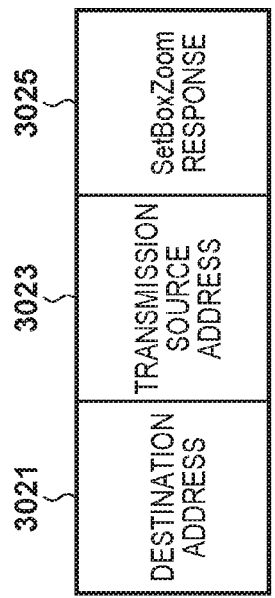

FIGS. 4A and 4B are views showing the structures of the SetBoxZoom command and the SetBoxZoom response.

FIG. 4A is a view showing the structure of the SetBoxZoom command. The SetBoxZoom command includes a destination address 3001, a transmission source address 3003, a data field 3005 indicating the SetBoxZoom request, a ProfileToken field 3007, a start point coordinate field 3009, and an end point coordinate field 3015.

The start point coordinate field 3009 and the end point coordinate field 3015 each include an X-coordinate field and a Y-coordinate field. More specifically, the start point coordinate field 3009 includes an X-coordinate field 3011 and Y-coordinate field 3013 that define the starting point in the range of the Box zoom region. The end point coordinate field 3015 includes an X-coordinate field 3017 and Y-coordinate field 3019 that define the starting point in the range of the Box zoom region.

The destination address 3001 stores the address of the image capturing apparatus which is the transmission destination of the SetBoxZoom command. The transmission source 3003 stores the address of the client 200 as the transmission source. Assume that an IP address will be used as the address, but as long as it is information (such as a MAC address) that will allow the communicating devices to uniquely identify each other, it is not limited this.

FIG. 4B is a view showing the structure of the SetBoxZoom response. The SetBoxZoom response includes a destination address 3021, a transmission address 3023, and a SetBoxZoom response field 3025.

The SetBoxZoom response indicates that the corresponding packet is a SetBoxZoom response by the SetBoxZoom response field 3025. The destination address 3021 stores the address of the client 200 as the transmission destination of the SetBoxZoom response. The transmission source address 3023 stores the address of the image capturing apparatus 100 as the transmission source.

In the embodiment, the image capturing apparatus 100 controls the pan/tilt/zoom operations by receiving the SetBoxZoom command shown in FIG. 4A from the client 200.

More specifically, the image capturing apparatus 100 first compares the value of the X-coordinate field 3011 of the start point and the value of the X-coordinate field 3017 of the end point included in the SetBoxZoom command. That is, the image capturing apparatus 100 compares the magnitude relation between the two values. Then, if it is determined by the comparison that the value of the Y-coordinate field 3011 is smaller than the value of the X-coordinate field 3017, an adjustment is made to increase the focal length of the zoom optical system of the image capturing apparatus 100. If the coordinate value of the X-coordinate field 3011 of the start point is larger than the coordinate value of the X-coordinate field 3017 of the end point, an adjustment is made to decrease the focal length of the zoom optical system of the image capturing apparatus 100. Furthermore, if the coordinate value of the X-coordinate field 3011 of the start point is the same value as the coordinate value of the X-coordinate field 3017 of the end point, the pan and tilt are adjusted so that the point related to the coordinate value in the control command will be positioned at the center of the current image.

In this manner, the image capturing apparatus 100 that received the SetBoxZoom command controls the pan/tilt/zoom operations based on the information stored in the command. The image capturing apparatus 100 performs a zoom-out operation if the value of the X-coordinate field 3011 of the start point is smaller than the value of the X-coordinate field 3017 of the end point. The image capturing apparatus 100 performs a zoom-in operation if the value of the X-coordinate field 3011 of the start point is larger than the value of the X-coordinate field 3017 of the end point. The image capturing apparatus 100 adjusts the pan/tilt/zoom operations so that the zoom operation at this time will set a Box zoom region designated by the start point coordinate field 3009 and the end point coordinate field 3015 as the image capturing range after the zoom-in operation.

Note that although the Box zoom region designated by the start point coordinate field 3009 and the end point coordinate field 3015 is set as the image capturing range after the zoom at the time of the zoom-out operation in the embodiment, the present invention is not limited to this. For example, the image capturing range after the zoom at the time of the zoom-out operation can be determined by another designation method. For example, the zoom out can be operated by a method that designates the coordinates of two points in the angle of view before the zoom out to be the start point coordinate field 3009 and the end point coordinate field 3015. In such a case, the zoom ratio uses, for example the ratio of the X-direction length of the Box zoom region designated by the start point coordinate field 3009 and the end point coordinate field 3015 to the horizontal length (X-direction length) of the image capturing region. The zoom ratio can also be designated by using a ratio of the Y-direction length of the Box zoom region designated by the start point coordinate field 3009 and the end point coordinate field 3015 to the vertical length (Y-direction length) of the image capturing region. Furthermore, the zoom ratio can be designated by using the ratio of the diagonal direction length of the Box zoom region designated by the start point coordinate field 3009 and the end point coordinate field 3015 and the diagonal direction length of the image capturing range.

Next, the arrangement of the coordinate system used in the embodiment will be described with reference to FIG. 5.

Figure 5:
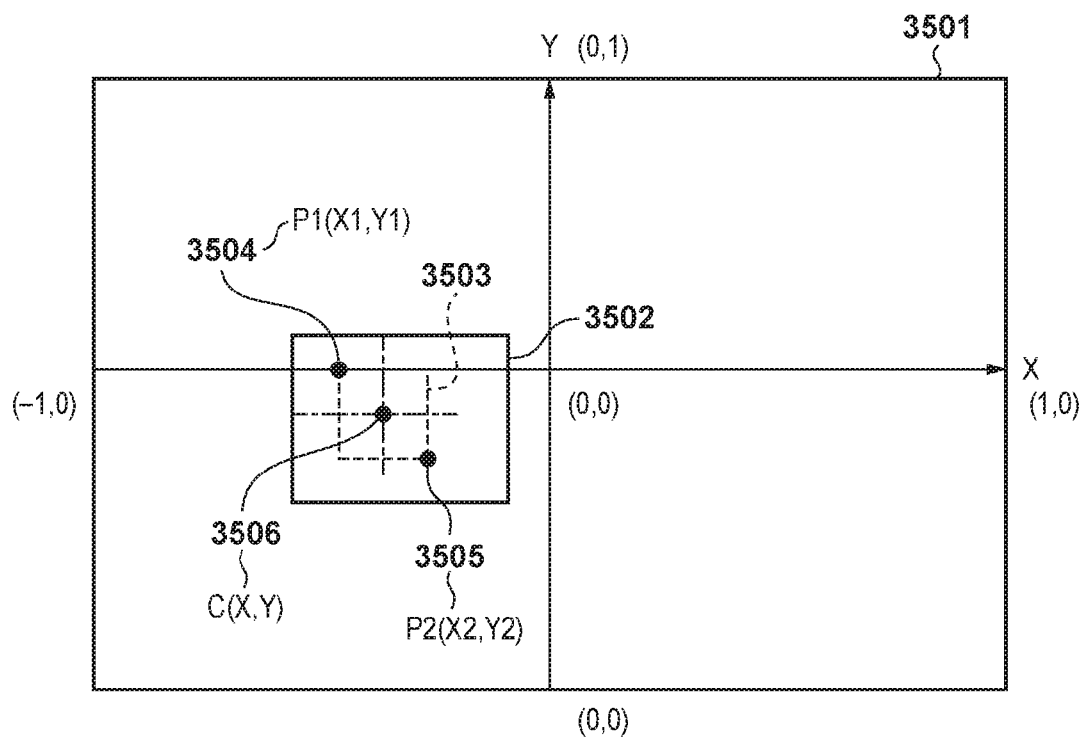
FIG. 5 is a view showing an example of a coordinate system.

In FIG. 5, a region 3501 is an image capturing range in which the image capturing apparatus 100 can capture an image and is defined by two-dimensional plane (two-dimensional coordinate system) of X- and Y- axes. An image capturing frame 3502 shows the angle of view of the image capturing apparatus 100. A region 3503 is a Box zoom region designated by the start point coordinate field 3009 and the end point coordinate field 3015 of the SetBoxZoom command. Coordinates 3504 are the start point coordinates of the SetBoxZoom command. Coordinates 3505 are the end point coordinates of the SetBoxZoom command. Coordinates 3506 are the center coordinates of the designated Box zoom region 3503.

In the coordinate system shown in FIG. 5, the image capturing range 3501 is defined so that the range of the X-coordinate values and the Y-coordinates values will be from −1 to +1. This coordinate system is called, for example, a normalized coordinate system. In the embodiment, the range of the X-coordinate values and the Y-coordinate values of the image capturing frame 3502 in this normalized coordinate system is arranged so that it will not change even if the pan/tilt/zoom operations of the image capturing apparatus are performed. That is in the normalized coordinate system of the embodiment, the image capturing range 3501 is arranged so that the X-coordinate values and the Y-coordinate values will be −1 to +1 regardless of the pan/tilt/zoom operations of the image capturing apparatus 100.

Note that this normalized coordinate can be arranged so that X-coordinate values and the Y-coordinate values of the current angle of view will be −1 to +1 and can be rearranged after the image capturing apparatus 100 has operated.

In FIG. 5, assume that the X-coordinate value is X1 and Y-coordinate value is Y1 for the start point coordinates 3504 of the SetBoxZoom command. In this case, X1 is stored in the X-coordinate field 3011 and Y1 is stored in the Y-coordinate field 3013 of the start point in FIGS. 4A and 4B. Also, in FIG. 5, assume that the X-coordinate value is X2 and Y-coordinate value is Y2 for the end point coordinates 3505 of the SetBoxZoom command. In this case, X2 is stored in the X-coordinate field 3017 and Y2 is stored in the Y-coordinate field 3019 of the end point in FIGS. 4A and 4B.

In the example shown in FIG. 5, since the start point X-coordinate value X1 is smaller than the end point X-coordinate value X2, a zoom-in operation is performed and an adjustment is made to increase the focal length of the image capturing optical system. In contrast to this example, if the start point X-coordinate value X1 is larger than the end point X-coordinate value X2, a zoom-out operation is performed and an adjustment is made to decrease the focal length of the image capturing optical system.

In addition, the image capturing apparatus 100 adjusts the pan and tilt operations with respect to a center point C which is the center coordinates 3506 of the Box zoom region according to the designated coordinates so that the coordinate point of the center point C will be set as the center after the zoom operation.

An example of display control of the captured image to be displayed on the display unit 210 of the client 200 for implementing this operation will be described with reference to FIG. 6.

Figure 6:
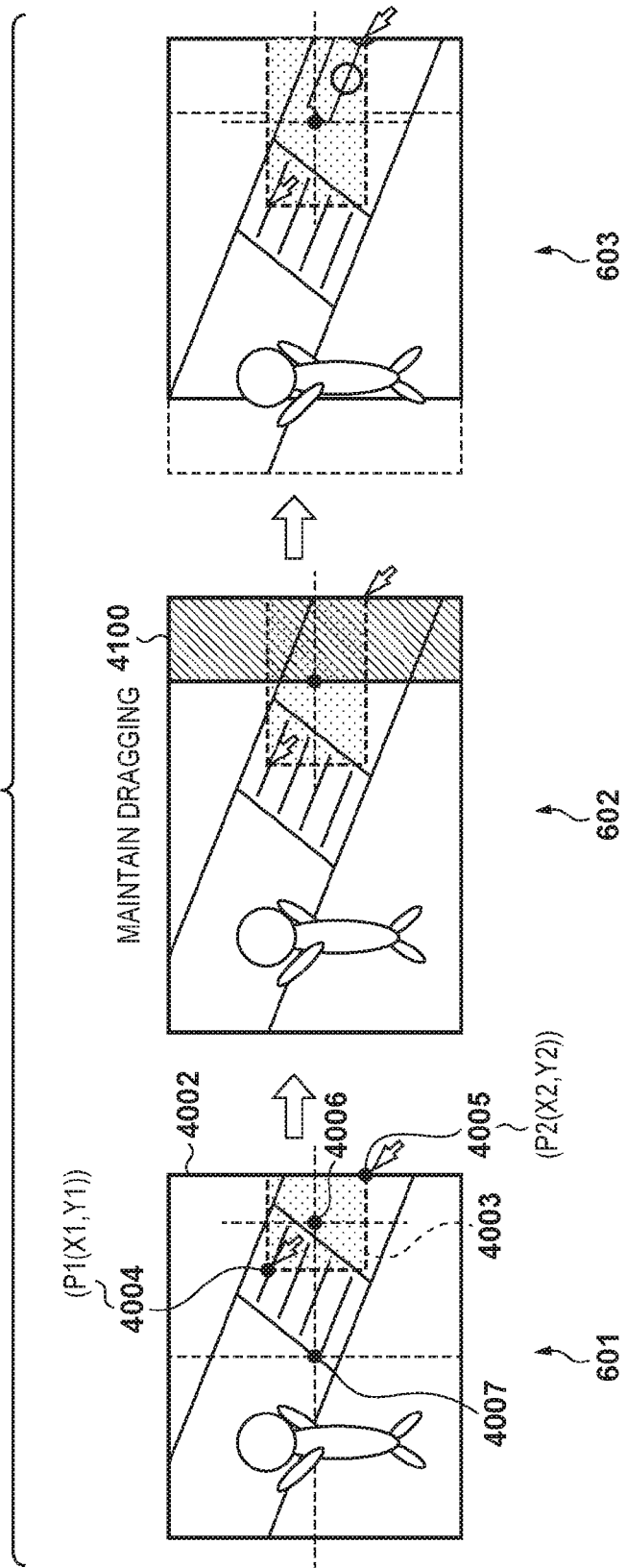
FIG. 6 is a view for explaining display control of a captured image.

In FIG. 6, a region 4002 is an image frame showing an angle of view. A region 4003 is a Box zoom region designated by the start point coordinate field 3009 and the end point coordinate field 3015 of the SetBoxZoom command. Coordinates 4004 are the start, point coordinates of the SetBoxZoom command. Coordinates 4005 are the end point coordinates of the SetBoxZoom command. Coordinates 4006 are the center coordinates of the designated Box zoom region.

601 of FIG. 6 is a view showing the captured image before the pan/tilt/zoom operations according to the embodiment. In 601 of FIG. 6, since an X-coordinate value X1 of the start point coordinates 4004 (P1) in the Box zoom region 4003 designated by the SetBoxZoom command is smaller than an X-coordinate value X2 of the end point coordinates 4005 (P2), a zoom-in operation is performed at the end of use operation.

In 602 of FIG. 6, if the Box zoom region 4003 exceeds the image capturing range 4002 in accordance with the moving operation of the Box zoom region 4003, the portion that has exceeded the image capturing range is displayed on a black belt region 4100 and the Box zoom region 4003 is held. At this time, pan/tilt/zoom commands giving instructions for an image capturing angle of view which includes at least a part of the Box zoom region 4003 may be transmitted to the image capturing apparatus 100.

603 of FIG. 6 is a view showing the captured image after the pan/tilt/zoom operations. The captured image received from the image capturing apparatus 100 is displayed in the black belt region 4100. Additionally, in the embodiment, the CPU 146 adjusts the pan/tilt/zoom operations so that the center point 4006 of the Box zoom region 4003 designated at the time when the user operation ended is set as the center 4007 of an image capturing angle of view.

Next, the respective operations of the client 200 and the image capturing apparatus 100 will be described with reference to the flowcharts of FIGS. 7A and 7B.

Figure 7B:
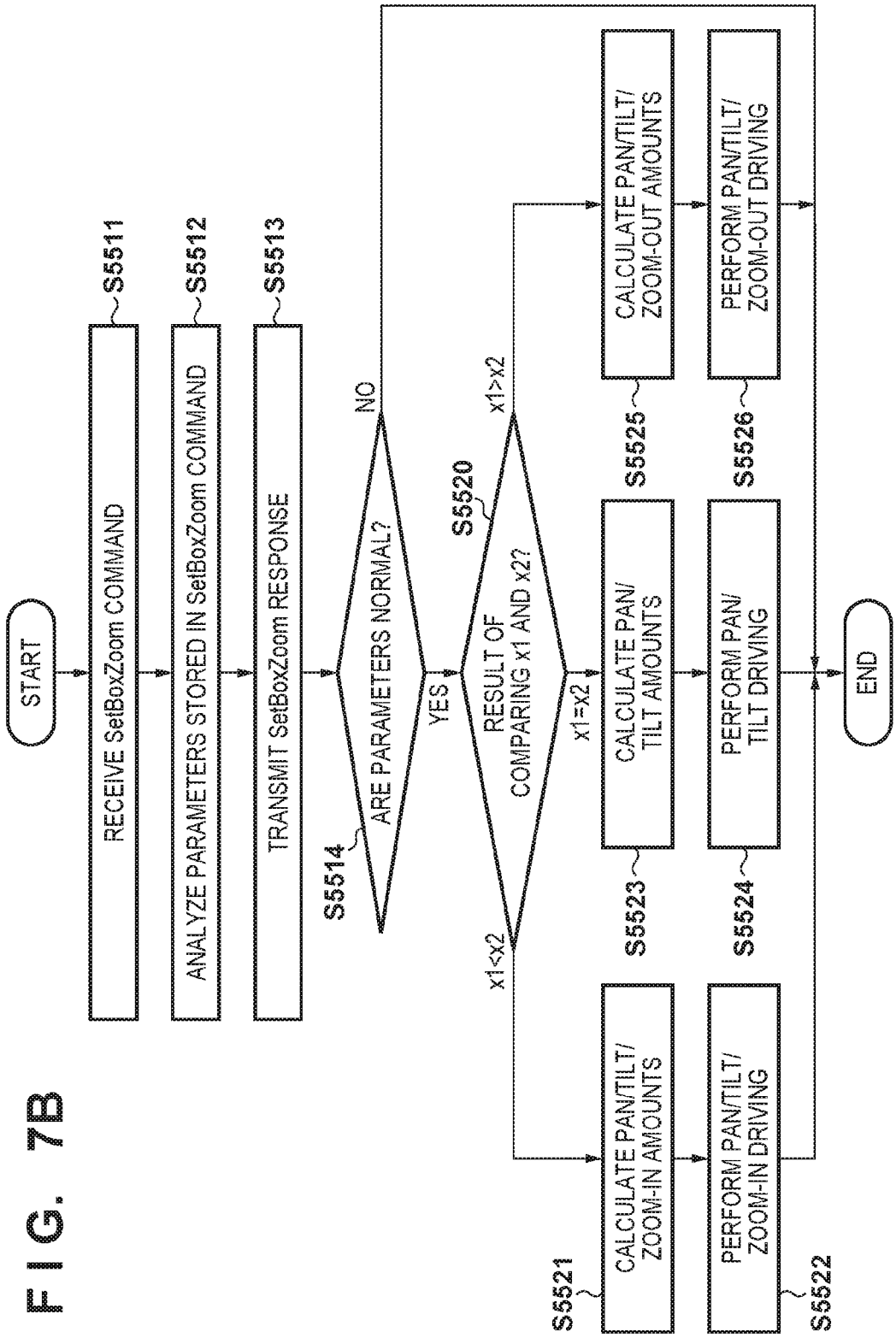

Note that the flowchart shown in FIG. 7A is implemented by the CPU 246 of the client 200 reading out and executing a program stored in the non-volatile memory 248. The flowchart shown in FIG. 7B is implemented by the CPU 146 of the image capturing apparatus 100 reading out and executing a program stored in the non-volatile memory 148.

In FIG. 7A, the CPU 246 of the client 200 determines, in step S5001, whether the Box zoom region exceeds the range (image capturing range) of the captured image based on an operation by the user on the captured image to be displayed on the display unit 210. If it is determined that the Box zoom region does not exceed the image capturing range (NO in step S5001), the process advances to step S5007. On the other hand, if it is determined that the Box zoom region exceeds the image capturing range (YES in step S5001), the CPU 246 determines whether the Box zoom region can fit within the maximum angle of view of the image capturing apparatus 100 in step S5002.

Note that this determination determines whether the Box zoom region exceeds the image capturing range by, for example, determining whether the end point (second coordinate values) of the Box zoom region has reached the image capturing range.

If it is determined that the Box zoom region is within the maxim angle of view of the image capturing apparatus 100 (YES in step S5002), the CPU 246 displays, in the black belt region, the portion that exceeds the currently displayed range (image capturing range) of the captured image of the image capturing apparatus 100 and holds the Box zoom region in step S5003. In step S5004, the CPU 246 calculates the pan/tilt/zoom amounts that set the Box zoom region within the captured image and creates a SetBoxZoom command including the calculated pan/tilt/zoom amounts. In step S5501, the CPU 246 transmits the created SetBoxZoom command to the image capturing apparatus 100. The client 200 can control driving of the pan/tilt/zoom mechanisms of the image capturing apparatus 100 by transmitting this SetBoxZoom command to the image capturing apparatus 100.

On the other hand, if it is determined that the Box zoom region is not within the maximum angle of view of the image capturing apparatus 100 (NO in step S5002), the CPU 246 controls the display of the Box zoom region so that the coordinate positions of the Box zoom region does not exceed the maximum angle of view in step S5006. In step S5007, the CPU 246 determines whether user operation has ended. If it is determined that the user operation has not ended (NO in step S5007), the process returns to step S5001. Otherwise (YES in step S5007), the CPU 246 calculates, in step S5008, the pan/tilt/zoom amounts that set the center coordinates of the Box zoom region at the center of the captured image and creates a SetBoxZoom command including the calculated pan/tilt/zoom amounts. In step S5502, the CPU 246 transmits the created SetBoxZoom command to the image capturing apparatus 100.

Next, the operation (driving of pan/tilt/zoom mechanisms) executed by the image capturing apparatus 100 in accordance with the SetBoxZoom command received from the client 200 will be described with reference to FIG. 7B.

In step S5511, the CPU 146 of the image capturing apparatus 100 receives the SetBoxZoom command from the client 200. In step S5512, the CPU 146 analyzes the parameters stored in the received SetBoxZoom command. The parameters to be analyzed in this case are, for example, the ProfileToken field 3007, the start point coordinate field 3009, and the end Point coordinate field 3015 shown in FIG. 4A.

In step S5513, the CPU 146 transmits to the client 200 a SetBoxZoom response in return for the SetBoxZoom command. In step S5514, the parameter analysis result of the SetBoxZoom command is evaluated to determine whether the parameters are normal.

If it is determined that the parameters are abnormal (NO in step S5514), the processing is determined to be inexecutable and is ended. A case in which the value of the ProfileToken field 3007 is not a value set is the image capturing apparatus 100 is an example of parameter abnormality. A case in which at least one of the start point coordinate field 3009 and the end point coordinate field 3015 is at a value range not supported by the image capturing apparatus 100 can be enumerated as another example of parameter abnormality.

Note that if the parameters are normal, the SetBoxZoom response to be transmitted in step S5513 will be a SUCCESS response. On the other hand, if the parameters are abnormal, the SetBoxZoom response will be a FAIL response.

On the other hand, if it is determined that the parameters are normal (YES in step S5514), the start point X-coordinate value X1 and the end point X-coordinate value X2 are compared in step S5520.

If it is determined that the value of X1 is smaller than the value of X2 (X1<X2), the CPU 146 calculates the pan/tilt/zoom-in amount in step S5521. Then, in step S5522, the CPU 146 performs the pan/tilt/zoom-in operations in accordance with the calculated pan/tilt/zoom-in amounts.

If it is determined that the value of X1 and the value of X2 are same (X1=X2), the CPU 146 calculates the pan/tilt amounts in step S5523. In step S5523, the CPU 146 performs the pan/tilt operations in accordance with the calculated pan/tilt amounts.

If it is determined that the value of X1 is larger than the value of X2 (X1>X2) in step S5020, the CPU 146 calculates the pan/tilt/zoom-out amounts in step S5525. In step S5526, the CPU 146 performs the pan/tilt/zoom-out operations in accordance with the calculated pan/tilt/zoom-out amounts.

Note that the client 200 can use the GetConfigurationOptions command 1203 to inquire, of the image capturing apparatus 100, about capability information indicating whether the SetBoxZoom command is executable. Therefore, the client 200 can transmit the GetConfigurationOptions command 1203 serving as an inquiry command to an image capturing apparatus that has never been connected to the client 200 in the past. Based on a response from this image capturing apparatus, even if the communication destination image capturing apparatus is an image capturing apparatus that has not been connected to the client 200 in the past, the operation of this image capturing apparatus can be controlled by issuing a SetBoxZoom command.

As described above, according to the embodiment, the image capturing range of the captured image can be easily and appropriately adjusted. For example, user operation can be assisted and supported so that the user can appropriately designate a zoom region on the captured image.

According to the present invention, the image capturing range of the captured image can be easily and appropriately adjusted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus that obtains a captured image from an image capturing apparatus and controls a display of the captured image on a display screen of a display unit, comprising:
    one or more processors; and
    a memory storing instructions that, when executed by the one or more processors, cause the image capturing apparatus to:
        determine a region defined by a pair of first coordinate values and a pair of second coordinate values at least one of which is designated on the captured image displayed on the display screen;
        control the display unit to shift a display of the captured image, when the region exceeds a display range of the captured image in accordance with an operation of designating at least one of the pair of first coordinate values and the pair of second coordinate values, by a portion that has exceeded the range; and
        output a command to control at least one of pan, tilt, and zoom for obtaining a captured image corresponding to the determined region.

2. The apparatus according to claim 1, wherein the command is determined based on a magnitude relation between the pair of first coordinate values and the pair of second coordinate values defining the region.

3. The apparatus according to claim 1, wherein the command is for capturing an image of which a center corresponds to a center of the determined region.

4. The apparatus according to claim 1, wherein the instructions, when executed by the one or more processors, further cause the image capturing apparatus to control the display of the determined region so that the determined region does not exceed the maximum angle of view of the image capturing apparatus.

5. The apparatus according to claim 1, wherein the pair of first coordinate values and the pair of second coordinate values each are coordinate values of a two-dimensional coordinate system for displaying the captured image on the display unit,
    the pair of first coordinate values are coordinate values defining a start point of a range of the region,
    the pair of second coordinate values are coordinate values defining an end point of the range of the region, and
    wherein the instructions, when executed by the one or more processors, further cause the image capturing apparatus to determine whether the region exceeds the range of the captured image based on whether the pair of second coordinate values exceed the range of the captured image.

6. The apparatus according to claim 1, wherein the instructions, when executed by the one or more processors, further cause the image capturing apparatus to control the display unit to display a predetermined image by the portion that has exceeded the range.

7. A control method for obtaining a captured image from an image capturing apparatus and controlling a display of the obtained image on a display unit, comprising:
    determining a region defined by a pair of first coordinate values and a pair of second coordinate values at least one of which is designated on a captured image displayed on the display screen;
    controlling a display unit to shift a display of the captured image, when the region exceeds a display range of the captured image in accordance with an operation of designating at least one of the pair of first coordinate values and the pair of second coordinate values, by a portion that has exceeded the range; and
    outputting a command to control at least one of pan, tilt, and zoom for obtaining a captured image corresponding to the determined region.

8. The method according to claim 7, wherein the command is determined based on a magnitude relation between the pair of first coordinate values and the pair of second coordinate values defining the region.

9. The method according to claim 7, wherein the command is for capturing an image of which a center corresponds to a center of the determined region.

10. The method according to claim 7, further comprising controlling the display of the determined region-so that the determined region does not exceed the maximum angle of view of the image capturing apparatus.

11. A non-transitory computer-readable storage medium storing a computer program for causing a computer to execute a control method for obtaining a captured image from an image capturing apparatus and controlling display of the obtained image on a display unit, comprising:
  determining a region defined by a pair of first coordinate values and a pair of second coordinate values at least one of which is designated on a captured image displayed on the display screen;
  controlling a display unit to shift a display of the captured image, when the region exceeds a display range of the captured image in accordance with an operation of designating at least one of the pair of first coordinate values and the pair of second coordinate values, by a portion that has exceeded the range; and
  outputting a command to control at least one of pan, tilt, and zoom for obtaining a captured image corresponding to the determined region.

12. The non-transitory computer-readable storage medium according to claim 11, wherein the command is determined based on a magnitude relation between the pair of first coordinate values and the pair of second coordinate values defining the region.

13. The non-transitory computer-readable storage medium according to claim 11, wherein the command is for capturing an image of which a center corresponds to a center of the determined region.

14. The non-transitory computer-readable storage medium according to claim 11, further comprising controlling the display of the determined region-so that the determined region does not exceed the maximum angle of view of the image capturing apparatus.

* * * * *